Patented Dec. 31, 1929

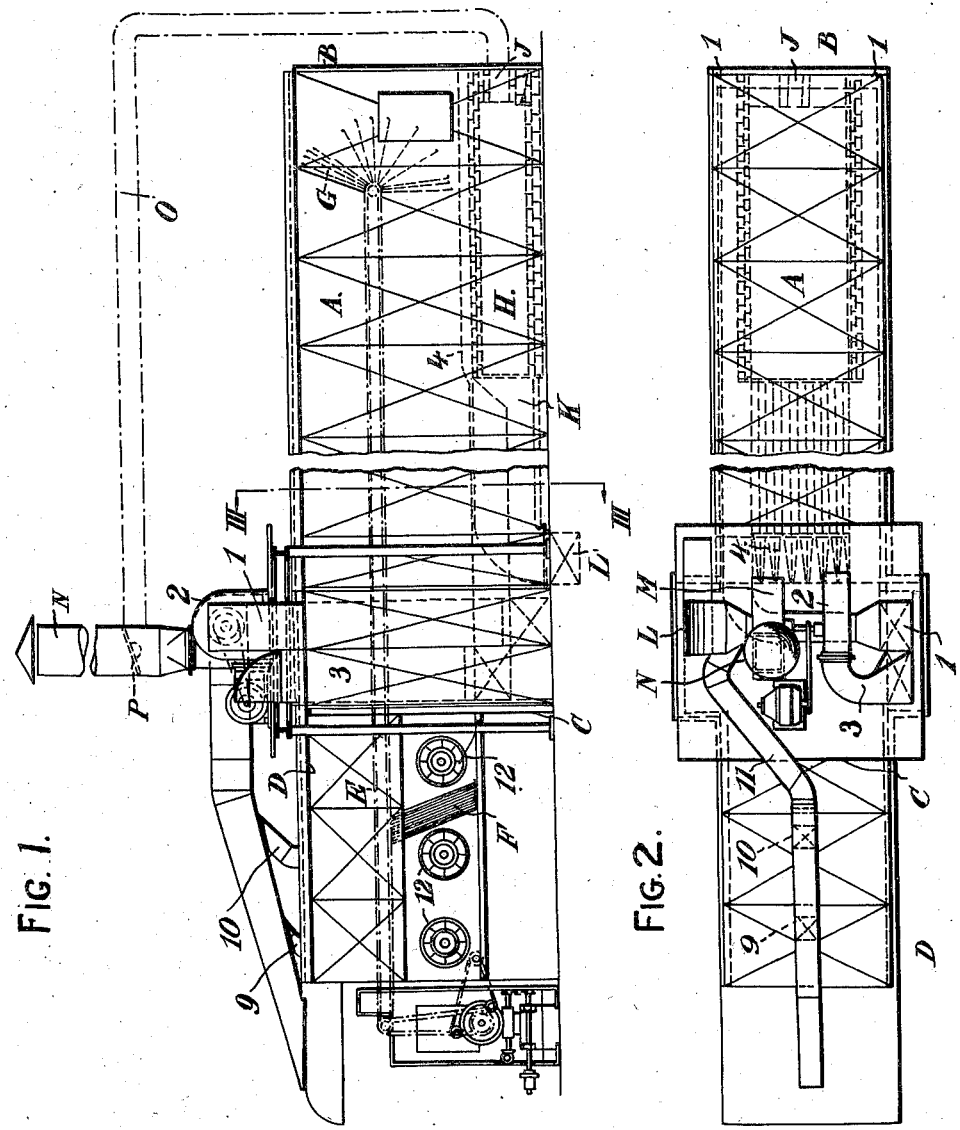

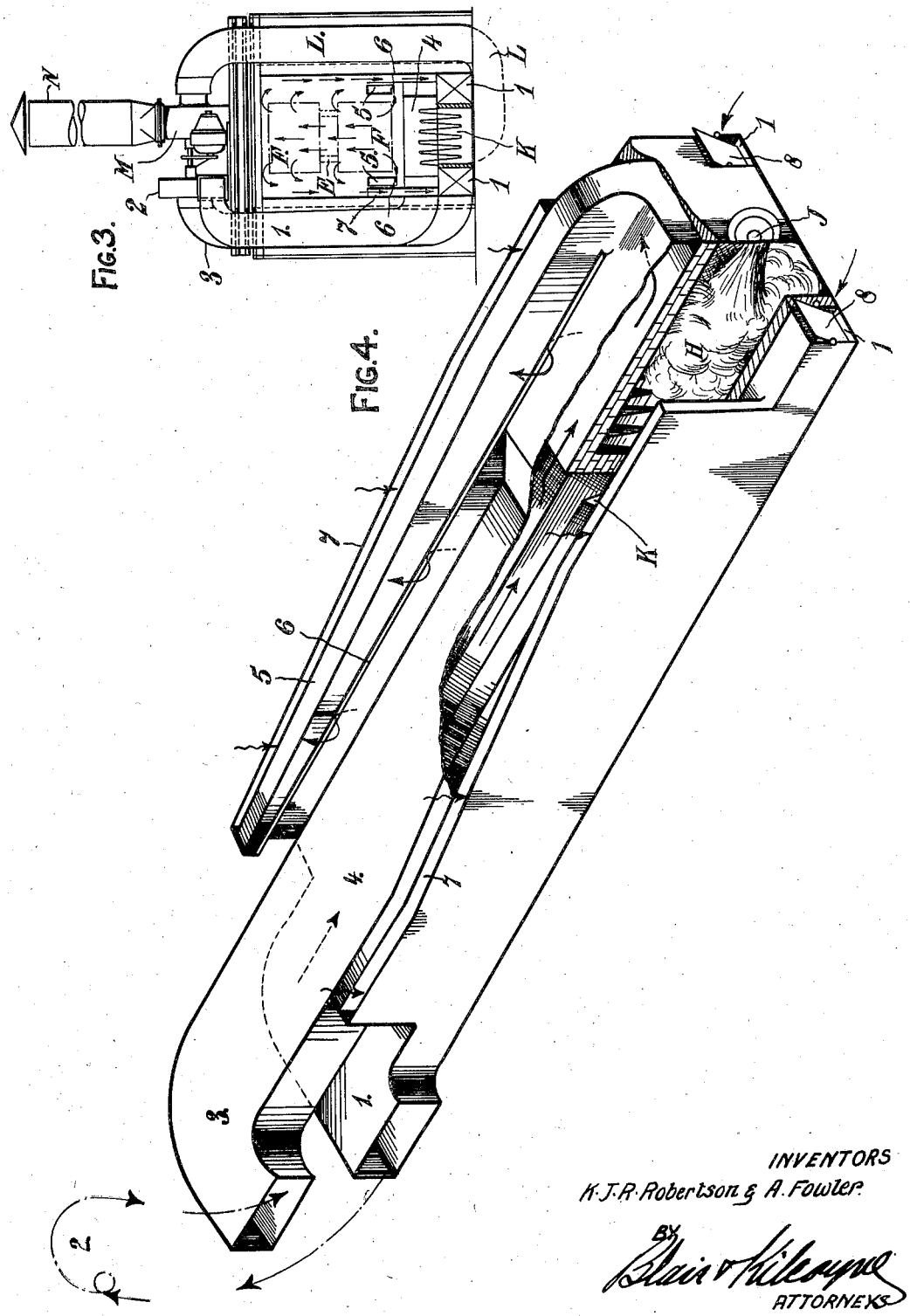

1,742,099

UNITED STATES PATENT OFFICE

KENNETH JAMES RENNIE ROBERTSON AND ALEXANDER FOWLER, OF LONDON, ENGLAND, ASSIGNORS TO CARRIER ENGINEERING COMPANY LIMITED, OF LONDON, ENGLAND

DRYING OVEN

Application filed June 20, 1929, Serial No. 372,369, and in Great Britain June 18, 1928.

This invention relates to drying ovens and has more especial reference to ovens the drying air for which is heated prior to entry by a contra-flow exchange with the gases of the furnace heating the oven, and the object of the invention is to provide an improved construction of continuous oven wherein uniform drying conditions may be mantained and the heat evolved by the furnace completely utilized.

According to the invention an oven within which a current of air is formed for drying the articles therein, is characterized by a furnace flue running along the oven and an associated air duct arrangement through which the drying air is caused to flow in an opposite direction to the flue gases, whereby a heat exchange is effected and the drying air gradually attains heat prior to entering the oven.

Conveniently the flue is of furrowed or corrugated form to obtain an extensive heat exchange surface and the associated air duct is obtained by boxing over the said furrows or corrugations.

In such an arrangement the air will be forced along the air duct in opposite direction to the flue gases so that they become hotter and hotter and after passing through this duct may be directed over the roof of the furnace so as to obtain the maximum temperature before being directed into the oven itself.

Preferably the entry of the air into the oven is obtained by directing the air through a distributing duct running lengthwise within the oven so as to set up circulation therein in the nature of convection currents.

Conveniently the distributing duct is slotted so that the air emerges into the oven in a thin sheet.

The convection currents may be augmented by drawing off some of the heated air from the oven conveniently from the lower zones or bottom thereof; it may also be drawn from the top, and preferably this withdrawal of part of the drying air is obtained by embodying in the apparatus an arrangement of ducts whereby a recirculation of drying air with fresh air through the air duct heated by the combustion products is effected.

For the purpose of quickly handling articles such as sheet metal in an oven constructed according to the invention, conveyor systems of known form may be employed. To this end one end of the oven is open, that is the end remote from the furnace, and in such a construction means are provided whereby the drying air in the oven is drawn away from the open end so as to obtain a continual drift of warm air through the oven from the hotter end and a sealing off of the open end preventing an inrush of cold air. To this end the open end of the oven may be formed with a canopy through which openings are formed at intervals lengthwise thereof leading to a suction means for drawing off the drying air.

The open end of the oven may be extended by a platform or the like, for example, for the length of the canopy, carrying fans or their equivalent whereby a draught of cold air is directed across the path of exit of the articles to be dried thereby rapidly cooling them to facilitate handling.

In order that the invention may be more clearly understood reference will now be made to the accompanying drawings which show by way of example a preferred construction embodying the present invention, in which Fig. 1 shows in elevation one form of oven embodying a furnace and a heat exchange system according to the present invention;

Fig. 2 is a plan thereof; and

Fig. 3 is a sectional elevation on the line 111—111 of Fig. 1.

Fig. 4 being a pictorial view of the arrangement of gas flues and air ducts below and within the oven.

Referring now to the drawings. The oven A, which may be formed by sheet metal attached to a steel framework, is closed at the end B and open at the end C and at the open end has a canopy D, the materials to be dried, for instance, sheet metal, being conveyed through the oven by a conveyor system E adapted to traverse the sheet material indicated at F through the oven and back, the sheet material being carried on holders, as for example indicated at G carried by the conveyor system.

Under the oven A and as an integral part thereof is a furnace H, conveniently charged through a liquid fuel burner indicated at J, the products of combustion from the furnace being conducted from the furnace by a flue duct K, running lengthwise thereof and connected by a duct L to an exhausting fan M which withdraws the combustion gases along the flue and discharges them through the vent indicated at N. In such an arrangement the hottest end of the furnace is the closed end.

Now in accordance with the invention the materials such as sheets F passing through the oven are dried by a current of air traversing the oven and heated by the flue gases.

On each side of the furnace are fresh air inlet ducts identified by the reference 1 which run towards the open end of the oven and are there connected, and merge into a conduit leading to a fan 2 which draws the fresh air through the conduit 1 and discharges it through a duct 3 to a duct 4 formed by boxing over the outside of the flue K. The duct so formed therefore comprises the external wall of the flues of corrugated form which constitutes a heat exchange surface.

As already explained the flue gases are drawn by the fan M away from the furnace along the flues K but the fan 2 forces the fresh air (drawn in through the conduit 1) through the duct 4 associated with the flues in opposite direction to that taken by the flue gases. There is thereby obtained a contra-flow heat exchange in which the air destined for the oven passes from the cooler end to the hotter end of the flues, in other words, gets hotter and hotter until it passes over the roof of the furnace prior to entering the oven as hereafter mentioned.

The duct, as clearly shown in Fig. 4 is extended over the roof of the surface and then merges into side ducts 5 returning lengthwise of the oven and which, as indicated at 6, are slotted so as to allow a leak of the heated air in a thin sheet throughout the length of the oven to the roof thereof, the nature of the circulation of such air, as indicated by the arrows in Fig. 3 being that of convection currents.

At each side of the oven there are trough like ducts 7 open at the top and which stop just before the closed end of the oven. These trough like ducts open into the supply ducts 1 and consequently a pull by the fan 2 on the ducts 1 causes an entry into the ducts 7 through the open tops thereof of drying air in the oven, as clearly shown by the arrows in Figs. 3 and 4.

As the ducts 7 operate to return the drying air into the circulatory system they may be referred to as return air ducts, and it will be clear from the arrangement, such as shown in Fig. 4, that the air so extracted from the oven through the return air ducts 7 is recirculated through the fan and the conduit 4 back into the oven and is mixed with fresh air entering the conduits 1 prior to being reheated in the conduit 4.

By returning air already utilized in the oven into the circulatory system including the conduit 4, warm air is utilized and although the oven is being continually supplied with fresh air the air delivered is but little less warm than the air in the oven and consequently a right temperature gradient for the oven is obtained and maintained.

The regulation of the admission of fresh air to the system may be effected by baffle members such as indicated at 8.

In view of the fact that the oven is open at the end C there is a tendency for cold air to enter. This is avoided by providing this openings 9, 10, in the canopy D which are connected by a duct 11 to the exhaust fan M. By drawing the heated drying air from beneath the canopy a continual drift of warm air through the oven is assured whilst the open end of the oven is effectually sealed against an inrush of cold air.

As indicated in Fig. 1 the warm air vacated from the canopy may be returned through a duct, e. g. O to the oil burners or the furnace, such return being controlled by a baffle P, thereby additional economy is attained.

At the open end of the furnace a battery of fans such as indicated at 12, Fig. 1 may be provided above the platform over which the materials being treated, such as the sheets F, are vacated from the oven, the fans being disposed so as to direct a stream of cold air across the path of exit of the said materials thereby cooling them sufficiently to facilitate immediate manipulation after the drying process.

What we claim is:

1. An oven within which a current of air is formed for drying articles therein, comprising the combination with the oven of a furnace, a flue to said furnace running along the oven, and an air duct arrangement associated with said flue through which drying air for the oven is caused to flow in opposite direction to the flue gases, and thereby gradually attain heat prior to entering the oven, a chamber associated with said oven, and a conveyor therein for carrying articles to be dried thru said chamber so that the articles are subjected to the hottest zones of the oven midway of their travel.

2. An oven within which a current of air is formed for drying articles therein, comprising a drying chamber open at one end having upper and lower passages thru which the articles to be dried are carried, a furnace integral with said drying chamber, a flue to said furnace running along and adjacent said chamber and an air duct arrangement associated with said flue through which the drying air for the oven is caused to flow in opposite direction to the flue gases and thereby gradually attain heat prior to entering the chamber at the point of connection between the upper and lower passages of said chamber.

3. An oven within which a current of air is formed for drying articles therein, comprising the combination with a drying chamber open at one end of a furnace at the closed end to maintain the closed end substantially hotter than the open end, a flue to said furnace running along said chamber, an air duct arrangement associated with said flue through which the drying air for the oven is caused to flow in opposite direction to the flue gases, and gradually attain heat prior to entering the chamber, and a conveyor for traversing the articles to be dried through said chamber so that the articles are subjected to the hottest zones of the oven midway of their travel.

4. An oven within which a current of air is formed for drying articles therein, comprising the combination with the oven of a furnace, a flue to said furnace running along the oven, an air duct arrangement associated with said flue through which the drying air for the oven is caused to flow in opposite direction to the flue gases to gradually attain heat prior to entering the oven, open distributing ducts extending along the sides of the oven whereby to cause a circulatory movement of the drying air therein, and exhaust ducts through which air is withdrawn from the oven.

5. An oven within which a current of air is formed for drying articles therein, comprising a drying chamber open at one end, a furnace integral with said drying chamber located at the closed end to maintain the closed end substantially hotter than the open end, a flue to said furnace running along said chamber, and an air duct arrangement associated with said flue through which drying air for the oven is caused to flow in opposite direction to the flue gases to gradually attain heat prior to entering the oven, and suction means for maintaining a continual drift of drying air from the closed end to the open end of said chamber to seal the entry of the chamber and prevent the inrush of cold air.

6. An oven within which a current of air is formed for drying articles therein, comprising the combination with the oven of a furnace, a flue to said furnace running along the oven, an air duct arrangement associated with said flue, suction means for said duct to cause the drying air to flow through the duct in opposite direction to the flue gases to gradually attain heat prior to entering the oven, open distributing ducts extending along the sides of the oven whereby to cause a circulatory movement of the drying air therein, and exhaust ducts through which air is withdrawn from the oven.

7. An oven within which a current of air is formed for drying articles therein, comprising a drying chamber open at one end, a furnace integral with said drying chamber, a flue to said furnace running along said chamber, an air duct arrangement associated with said flue through which the drying air for the oven is caused to flow in opposite direction to the flue gases and thereby gradually attain heat prior to entering the chamber, a conveyor having a return path for carrying articles to be dried through said chamber, the turning point of said conveyor being adjacent the point of highest temperature, and means for directing a draught of cold air across the exit of the oven whereby articles are discharged at a temperature permitting manipulation.

8. An oven within which a current of air is formed for drying articles therein, comprising the combination with the oven of a furnace, a flue to said furnace running along the oven, an air duct arrangement running first in one direction and then in the opposite direction associated with said flue, suction means for said duct to cause the drying air to flow finally through the duct in opposite direction to the flue gases to gradually attain heat prior to entering the oven, open distributing ducts whereby to cause a circulatory movement of the drying air therein, exhaust ducts through which air is withdrawn from the oven so that the articles are subjected to the hottest zones of the oven midway of their travel, and means for mixing with the supply of drying air variable quantities of recirculation air from the oven.

9. An oven within which a current of air is formed for drying articles therein, comprising the combination with the oven of a furnace, a flue to said furnace running along the oven, an air duct arrangement associated with said flue, suction means for said duct to cause the drying air to flow through the duct in opposite direction to the flue gases to gradually attain heat prior to entering the oven, open distributing ducts whereby to cause a circulatory movement of the drying air therein, exhaust ducts through which air is withdrawn from the oven, a conveyor traversing articles to be dried through the oven, and means for mixing with the supply of drying air variable quantities of recirculation air from the oven.

In testimony whereof we offix our signatures.

KENNETH JAMES RENNIE ROBERTSON.
ALEXANDER FOWLER.